United States Patent
Koehn

(10) Patent No.: US 6,526,730 B2
(45) Date of Patent: Mar. 4, 2003

(54) PROCESS FOR SEALING A FILLED SACK MADE OF THERMOPLASTIC PLASTIC AND PROVIDED WITH GUSSETS

(75) Inventor: Uwe Koehn, Osnabrueck (DE)

(73) Assignee: Windmoeller & Hoelscher, Lengerich (DE)

( * ) Notice: Subject to any disclaimer, the term of this patent is extended or adjusted under 35 U.S.C. 154(b) by 0 days.

(21) Appl. No.: 09/916,334

(22) Filed: Jul. 30, 2001

(65) Prior Publication Data

US 2002/0011048 A1 Jan. 31, 2002

(30) Foreign Application Priority Data

Jul. 28, 2000 (DE) .......................... 100 36 908
Oct. 10, 2000 (DE) .......................... 100 50 057

(51) Int. Cl.$^7$ .............................................. B65B 51/10
(52) U.S. Cl. ........................................ 53/479; 53/370
(58) Field of Search ........................ 33/479, 416, 450, 33/459, 477, 547, 370.7, 373.7

(56) References Cited

U.S. PATENT DOCUMENTS

| 4,373,979 A | * | 2/1983 | Planeta ....................... 156/217 |
| 4,538,396 A | * | 9/1985 | Nakamura .................... 53/412 |
| 4,913,561 A | * | 4/1990 | Beer ........................... 383/120 |
| 4,975,133 A | * | 12/1990 | Gochermann ............. 156/580.2 |
| 5,007,233 A | * | 4/1991 | Bose ........................... 383/111 |
| 5,918,735 A | * | 7/1999 | Bando et al. ................ 204/494 |

FOREIGN PATENT DOCUMENTS

| DE | 27 46 125 | | 4/1978 |
| DE | 93 01 355 | | 1/1994 |
| DE | 197 12 498 | | 10/1998 |
| DE | 199 36 660 | | 11/2000 |
| EP | 0 439 789 | | 8/1991 |
| GB | 1592905 | * | 7/1981 |
| GB | 2323557 | * | 9/1998 |

* cited by examiner

Primary Examiner—Ted Kavanaugh
(74) Attorney, Agent, or Firm—Jacobson Holman PLLC

(57) ABSTRACT

A sack made of thermoplastic plastic that has been provided with gussets is closed after being filled in that the open side of the sack is pulled tight and provided with a crosswise seal. In order to be able to produce the crosswise seal even when the region to be sealed is contaminated, the lateral regions of the crosswise seal are formed on the region of the sack, which is still lying flat, including the gussets and extending to the transitional region by a first sealing sequence, preferably by a thermal sealing process. After the sack has been filled, the middle region of the crosswise seal is produced by a second sealing sequence, preferably an ultrasound sealing process.

3 Claims, 1 Drawing Sheet

PROCESS FOR SEALING A FILLED SACK MADE OF THERMOPLASTIC PLASTIC AND PROVIDED WITH GUSSETS

BACKGROUND OF THE INVENTION

1. Field of the Invention

The invention relates to a process for sealing a filled sack made of thermoplastic plastic and provided with gussets in which the open side of the sack is pulled tight and closed with a crosswise seal.

2. Description of the Related Art

Devices for closing sacks in accordance with this process are known, for example, from BP 0 439 789 B1, 93 01 355 U1, and DE 199 36 660 A1. Using the known devices, the crosswise seal to close the sack at the top is produced by heated sealing jaws, i.e., by means of a thermal sealing process. In filling sacks with bulk material, it is impossible to prevent dust and residual filling from being deposited in the region of the sack through which the crosswise seal closing the sack is later formed, which prevents the creation of a good and tight seal.

SUMMARY OF THE INVENTION

The object of the invention is therefore to create a process of the type mentioned at the outset that allows a good and tight closing of the sack by means of a crosswise seal even when dust or other impurities have been deposited in the region of the opening to be closed by means of the crosswise seal.

This object is attained according to the invention in that, before the sack is filled, the lateral regions of the crosswise seal including the gussets are formed on the sack, which is still lying flat, up to the transitional region to the two-layer center region in the first sealing sequence and the center region of the crosswise seal is produced in the second sealing sequence after the sack has been filled.

Preferably, the first sealing sequence is performed using a thermal sealing process and the second sealing sequence is performed using an ultrasound sealing process.

In the process according to the invention, the parts of the crosswise seal sealing the sack that include the four-layer region of the gussets are produced using a thermal sealing process that is particularly suitable for sealing four layers and also allows a sealing of the transitional region from the four-layer gusset region and the two-layer center region. This sealing of the gusset region occurs by means of a thermal sealing process and is performed at a point in time at which the sack is not yet filled and thus the regions to be sealed with one another are not yet contaminated by dust or residual filling. After the formation of the regions of the crosswise seal including the gussets by means of a thermal sealing process, i.e., for example, by means of conventional sealing jaws, the sack can be held under the feed opening of a filling trunk by holding grippers. After the sack has been filled, the upper region is then pulled tight so that the walls of the two-layer region are resting against one another. According to the invention, this center region is then closed by means of a seal produced in an ultrasound sealing process. The advantage of sealing the center region in an ultrasound process lies in the fact that impurities are driven from the seal zone so that the crosswise seal can be produced in a problem-free manner between the pre-existing seals produced earlier that include the gussets.

The sealing of film layers of thermoplastic plastic resting against one another in an ultrasound sealing process is known, for example, from DE 197 12 498 C2.

It is useful for the seal produced in the ultrasound sealing process to overlap with the seals that were produced in a thermal sealing process, which have been extended past the gussets.

An exemplary embodiment of the invention shall be explained in greater detail in the following with reference to the drawings, which show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
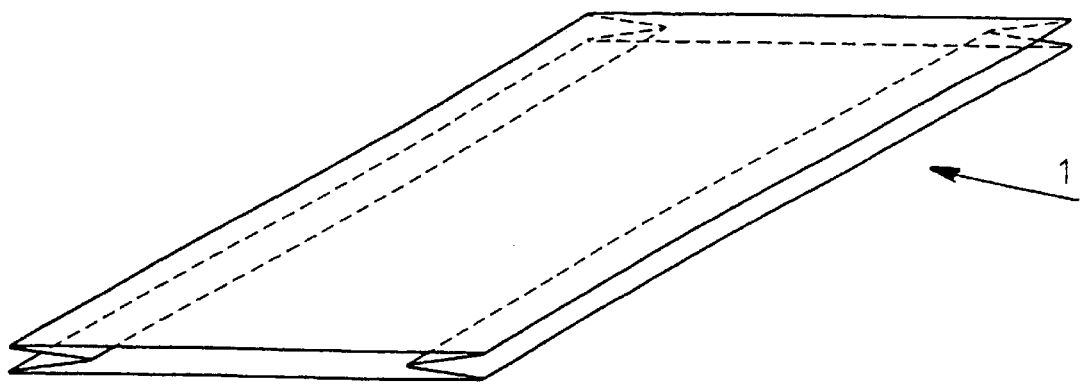
FIG. 1 a perspective view of a section of a tube made of thermoplastic plastic that has been provided with gussets, FIG. 2 a top view of the tube section in accordance with FIG. 2, whose open side has been provided with only the crosswise seals including the gussets, and FIG. 3 a drawing corresponding to FIG. 2 in which the crosswise seals on the sides, which include only the gussets, are connected to one another by a center seal that was produced in an ultrasound process.
Figure 2:
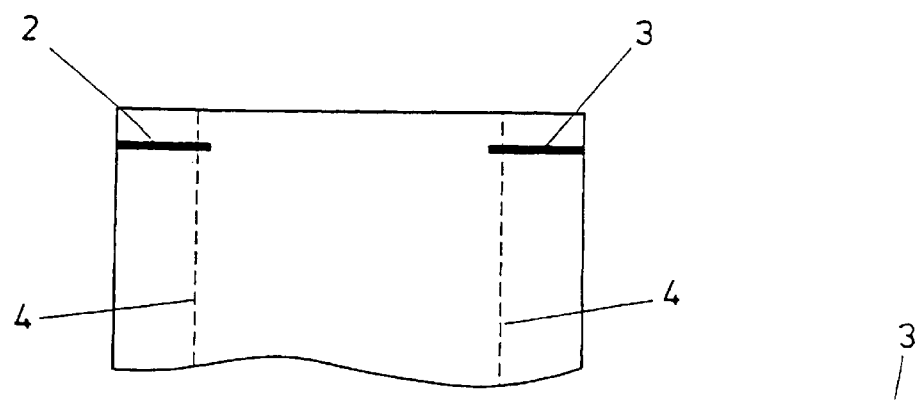
Figure 3:
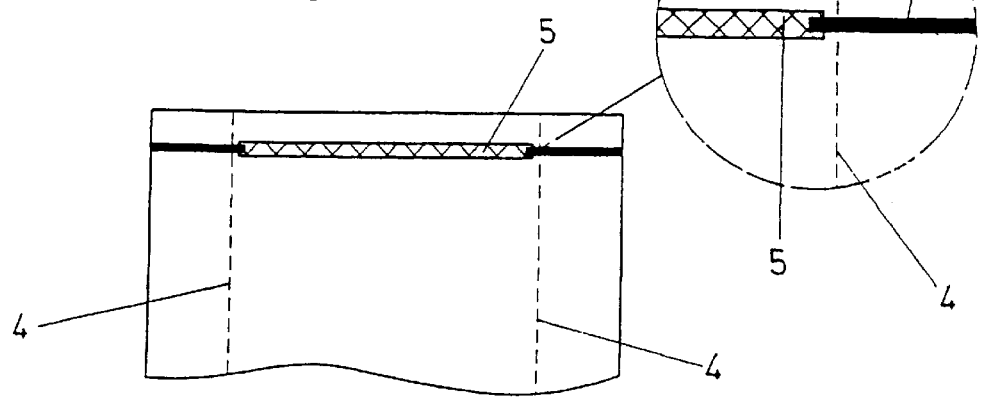

FIG. 1 shows a section of a tube made of thermoplastic plastic that is lying flat, from which an open sack is produced that is lying flat by application of a base seam, which is not shown. Before this sack is filled, partial crosswise seals 2, 3 that only include the gusset region are applied in its opening region in the manner shown in FIG. 2 according to a thermal sealing process, for example, by means of sealing jaws. These partial crosswise seals are produced up to the inner fold edge 4 of the gussets and end in the middle two-layer region of the sack in the transitional region from the four-layer gusset region to the two-layer middle region.

After producing the partial crosswise seals 2, 3, the sack, which is laying flat, is opened, for example, by moving the gusset regions toward one another, in such a way that it can be filled with bulk material, for example, by means of the insertion of a filling-trunk. After the sack has been filled, its open side is pulled tight such that the side walls are resting against one another. The middle region between the partial seals 2, 3 is then closed by a middle crosswise seal connecting these two partial seals, which is produced in an ultrasound sealing process.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A process for closing a filled sack made of thermoplastic plastic with gussets forming side regions having four layers of plastic, in which an open side of the sack is pulled tight and closed by means of a crosswise seal, comprising the steps of:

performing a first sealing sequence using a thermal sealing process before filling the sack, to form lateral regions of the crosswise seal extending from side edges of said sack including the gussets to a transitional region from the four-layered side regions to a two-layered middle region;

filling the sack; and performing a second sealing sequence using an ultrasound sealing process to form the middle region of said crosswise seal.

2. The process in accordance with claim 1, wherein said second sealing sequence is performed such that the seal over said middle region overlaps the lateral regions of said seal.

3. The process in accordance with claim 1 wherein said second sealing sequence is performed such that the seal over said middle region overlaps said lateral regions in the two-layer portion thereof extending beyond said gussets.

* * * * *